US007631066B1

(12) United States Patent  (10) Patent No.: US 7,631,066 B1
Schatz et al.  (45) Date of Patent: Dec. 8, 2009

(54) SYSTEM AND METHOD FOR PREVENTING DATA CORRUPTION IN COMPUTER SYSTEM CLUSTERS

(75) Inventors: Bob Schatz, Woodside, CA (US); Oleg Kiselev, Palo Alto, CA (US)

(73) Assignee: Symantec Operating Corporation, Cupertino, CA (US)

( * ) Notice: Subject to any disclaimer, the term of this patent is extended or adjusted under 35 U.S.C. 154(b) by 662 days.

(21) Appl. No.: 10/105,771

(22) Filed: Mar. 25, 2002

(51) Int. Cl.
 *G06F 15/173* (2006.01)
(52) U.S. Cl. ...................................................... 709/224
(58) Field of Classification Search ................. 709/224; 711/163–164; 714/100, 13
 See application file for complete search history.

(56) References Cited

U.S. PATENT DOCUMENTS

| 5,740,348 | A | * | 4/1998 | Cunliffe et al. ................. 714/6 |
| 5,828,889 | A | * | 10/1998 | Moiin et al. ................. 710/240 |
| 5,875,290 | A | * | 2/1999 | Bartfai et al. ................. 714/13 |
| 5,909,540 | A | * | 6/1999 | Carter et al. ................. 714/4 |
| 5,991,518 | A | * | 11/1999 | Jardine et al. ................. 714/4 |
| 5,999,712 | A | * | 12/1999 | Moiin et al. ................. 709/220 |
| 6,014,669 | A | * | 1/2000 | Slaughter et al. ............. 707/10 |
| 6,108,699 | A | * | 8/2000 | Moiin ........................ 709/221 |
| 6,192,401 | B1 | * | 2/2001 | Modiri et al. ............... 709/220 |
| 6,192,443 | B1 | * | 2/2001 | Mendel .......................... 711/1 |
| 6,226,717 | B1 | * | 5/2001 | Reuter et al. ................ 711/147 |
| 6,243,744 | B1 | * | 6/2001 | Snaman et al. .............. 709/220 |
| 6,279,032 | B1 | * | 8/2001 | Short et al. .................. 709/209 |
| 6,286,056 | B1 | * | 9/2001 | Edgar et al. .................... 710/5 |
| 6,314,526 | B1 | * | 11/2001 | Arendt et al. ................... 714/4 |
| 6,335,937 | B1 | * | 1/2002 | Chao et al. .................. 370/426 |
| 6,338,112 | B1 | * | 1/2002 | Wipfel et al. ................ 710/269 |

(Continued)

FOREIGN PATENT DOCUMENTS

EP    000772126 A2 *  5/1997

OTHER PUBLICATIONS

Vogels et al., "The Design and Architecture of the Microsoft Cluster Service—A Practical Approach to High-Availability and Scalability," Fault-Tolerant Computing, 1998, Digest of Papers, Twenty-Eighth Annual International Symposium on Munich, Germany, Jun. 23-25, 1998, pp. 422-431.*

(Continued)

*Primary Examiner*—J Bret Dennison
(74) *Attorney, Agent, or Firm*—Campbell Stephenson LLP

(57) ABSTRACT

Systems, methods, apparatus and software can make use of coordinator resources and SCSI-3 persistent reservation commands to determine which nodes of a cluster should be ejected from the cluster, thereby preventing them from corrupting data on a shared data resource. Fencing software operating on the cluster nodes monitors the cluster for a cluster partition (split-brain) event. When such an event occurs, software on at least two of the nodes attempts to unregister other nodes from a majority of coordinator resources. The node that succeeds in gaining control of the majority of coordinator resources survives. Nodes failing to gain control of a majority of coordinator resources remove themselves from the cluster. The winning node can also proceed to unregister ejected nodes from shared data resources. These operations can be performed in parallel to decrease failover time. The software can continue to execute on all nodes to prevent additional problems should a node erroneously attempt to reenter the cluster.

21 Claims, 6 Drawing Sheets

U.S. PATENT DOCUMENTS

| | | | |
|---|---|---|---|
| 6,363,495 B1 * | 3/2002 | MacKenzie et al. | 714/4 |
| 6,389,551 B1 * | 5/2002 | Yount | 714/4 |
| 6,393,485 B1 * | 5/2002 | Chao et al. | 709/231 |
| 6,438,705 B1 * | 8/2002 | Chao et al. | 714/4 |
| 6,449,641 B1 * | 9/2002 | Moiin et al. | 709/220 |
| 6,460,039 B1 * | 10/2002 | Pinter et al. | 707/10 |
| 6,460,149 B1 * | 10/2002 | Rowlands et al. | 714/43 |
| 6,487,678 B1 * | 11/2002 | Briskey et al. | 714/4 |
| 6,532,494 B1 * | 3/2003 | Frank et al. | 709/224 |
| 6,658,587 B1 * | 12/2003 | Pramanick et al. | 714/5 |
| 6,708,175 B2 * | 3/2004 | Curran et al. | 707/10 |
| 6,715,050 B2 * | 3/2004 | Williams et al. | 711/164 |
| 6,718,486 B1 * | 4/2004 | Roselli et al. | 714/41 |
| 6,789,213 B2 * | 9/2004 | Kumar et al. | 714/13 |
| 6,804,703 B1 * | 10/2004 | Allen et al. | 709/216 |
| 6,871,222 B1 * | 3/2005 | Frank et al. | 709/223 |
| 6,889,253 B2 * | 5/2005 | Griffin et al. | 709/221 |
| 6,965,936 B1 * | 11/2005 | Wipfel et al. | 709/224 |
| 7,010,528 B2 * | 3/2006 | Curran et al. | 707/8 |
| 7,020,695 B1 * | 3/2006 | Kundu et al. | 709/223 |
| 7,076,783 B1 * | 7/2006 | Frank et al. | 719/313 |
| 7,152,148 B2 * | 12/2006 | Williams et al. | 711/164 |
| 7,231,489 B1 * | 6/2007 | Larson et al. | 711/111 |
| 2001/0032324 A1 * | 10/2001 | Slaughter et al. | 714/4 |
| 2002/0042693 A1 * | 4/2002 | Kampe et al. | 702/186 |
| 2002/0188590 A1 * | 12/2002 | Curran et al. | 707/1 |
| 2003/0023680 A1 * | 1/2003 | Shirriff | 709/204 |
| 2003/0079100 A1 * | 4/2003 | Williams et al. | 711/165 |
| 2003/0159084 A1 * | 8/2003 | Murphy et al. | 714/13 |
| 2003/0177411 A1 * | 9/2003 | Dinker et al. | 714/13 |
| 2005/0033778 A1 * | 2/2005 | Price | 707/202 |
| 2005/0268154 A1 * | 12/2005 | Wipfel et al. | 714/4 |
| 2005/0283641 A1 * | 12/2005 | Clark et al. | 714/4 |

OTHER PUBLICATIONS

Kronenberg et al., "VAXclusters: A Closely-Coupled Distributed System," ACM Transactions on Computer Systems, vol. 4, No. 2, May 1986, pp. 130-146.*

*SCSI Primary Commands—3 (SPC-3)*, Working Draft, Revision 03, T10/1416-D, a Technical Committee of the Accredited Standards Committee of the National Committee for Information Technology Standards (NCITS), Jan. 10, 2002.

* cited by examiner

SYSTEM AND METHOD FOR PREVENTING DATA CORRUPTION IN COMPUTER SYSTEM CLUSTERS

FIELD OF THE INVENTION

The present invention relates to the field of fault tolerance in distributed computer systems and, more particularly, to preventing data corruption on a shared resource of a computer system cluster.

BACKGROUND OF THE INVENTION

Distributed computing systems are an increasingly important part of research, governmental, and enterprise computing systems. Among the advantages of such computing systems are their ability to handle a variety of different computing scenarios including large computational problems, high volume data processing situations, and high availability situations. For applications that require the computer system to be highly available, e.g., the ability to maintain the system while still providing services to system users, a cluster of computer systems is a useful implementation of the distributed computing model. In the most general sense, a cluster is a distributed computer system that works together as a single entity to cooperatively provide processing power and mass storage resources. With a cluster, the processing load of the computer system is typically spread over more than one computer, thereby eliminating single points of failure. Consequently, programs executing on the cluster can continue to function despite a problem with one computer in the cluster. In another example, one or more computers of the cluster can be ready for use in the event that another computer in the cluster fails. While each computer in a cluster typically executes an independent instance of an operating system, additional clustering software is executed on each computer in the cluster to facilitate communication and desired cluster behavior.

FIG. 1 illustrates a simplified example of a cluster 100. The members of the cluster include Server A 110 and Server B 120. As members of cluster 100, servers 110 and 120 are often referred to as "hosts" or "nodes." Thus, a node in a computer cluster is typically an individual computer system having some or all of the common as is well known in the art. FIG. 8 (described below) illustrates some of the features common to cluster nodes. Another common feature of a cluster is the ability of the nodes to exchange data. In the example of FIG. 1, servers 110 and 120 can exchange data over network 150, typically a local area network (LAN), e.g., an enterprise-wide intranet, or a wide area network (WAN) such as the Internet. Additionally, network 150 provides a communication path for various client computer systems 140 to communicate with servers 110 and 120. In addition to network 150, servers 110 and 120 can communicate with each other over private network 130. As shown, private network 130 is only accessible by cluster nodes, i.e., Server A 110 and Server B 120. To support the high availability of cluster 100, private network 130 typically includes redundancy such as two network paths instead of one. Private network 130 is used by the nodes for cluster service message passing including, for example, the exchange of so-called "heart-beat" signals indicating that each node is currently available to the cluster and functioning properly.

Other elements of cluster 100 include storage area network (SAN) 160, SAN switch 170, and storage array 180. As shown in FIG. 1, both Server A 110 and Server B 120 utilize multiple communications paths to SAN switch 170. SAN switch 170 and storage array 180 are two examples of shared resources. The most common shared resource in a cluster is some form of shared data resource, such as one or more disk drives. Using a shared data resource gives different nodes in the cluster access to the same data, a feature that is critical for most cluster applications. Although a disk device (and various related devices such as storage array 180) is perhaps the most common example of both a shared resource and a shared data resource, a variety of other types of devices will be well known to those having ordinary skill in the art. Moreover, although servers 110 and 120 are shown connected to storage array 180 through SAN switch 170 and SAN 160, this need not be the case. Shared resources can be directly connected to some or all of the nodes in a cluster, and a cluster need not include a SAN. Alternatively, servers 110 and 120 can be connected to multiple SANs. Additionally, SAN switch 170 can be replaced with a SAN router or a SAN hub.

One well known problem among computer system clusters occurs when one or more of the nodes of the cluster erroneously believes that other node(s) are either not functioning properly or have left the cluster. This "split-brain" condition results in the effective partitioning of the cluster into two or more subclusters. Causes of the split-brain condition include failure of the communication channels between nodes, e.g., failure of private network 130, and the processing load on one node causing an excessive delay in the normal sequence of communication among nodes, e.g., one node fails to transmit its heartbeat signal for an excessive period of time. For example, if cluster 100 is configured for failover operation with an application program such as a customer order entry system operating on server A 110 and server B 120 existing in the cluster to takeover for server A should it fail, then complete failure of private network 130 would lead server B to conclude that server A has failed. Server B then begins operation even though server A has not in fact failed. Thus, the potential exists that the two servers might attempt to write data to the same portion of storage array 180 thereby causing data corruption. The solution is to ensure that one of the nodes cannot access the shared resource, i.e., to "fence off" the node from the resource.

Cluster partitioning can take a variety of other forms and have a variety of detrimental effects. For example, a node might attempt to reenter a cluster after the node has already been successfully excluded from the cluster. Thus, the reentering node might encounter a cluster environment setup to exclude the node and interpret that instead as a partition event. Additionally, cluster partitioning can be problematic even though there is no shared resource among the cluster nodes. For example, if one node of a cluster is supposed to be the node interacting with a client device and another node detects a cluster partition, the client device could ultimately communicate with the wrong node thereby leading to some manner of error.

One previous fencing mechanism involves terminating operation of one of the nodes before the takeover occurs. This typically requires platform specific hardware for each of the nodes. Moreover, it is difficult (and potentially expensive) to scale this solution as the number of nodes in the cluster increases. Also, such a system can be difficult to administer. Another solution is to make use of primitive reservation and release functionality available with certain shared resources. For example, shared disk drives supporting version 2 of the small computer systems interface (SCSI-2) allow devices accessing the disk drives to reserve a disk drive using the SCSI-2 "reserve" command and subsequently release the disk drive for use by another device via the "release" command. Unfortunately, SCSI-2 reserve and release settings are cleared when there is a bus reset to the disk drive and thus there is no guarantee that the reservation will not be cleared when it is most needed. Additionally, SCSI-2 reserve and release commands do not work with dynamic multipath devices or with clusters having more than two nodes.

Accordingly, it is desirable to have scalable, flexible, and robust I/O fencing scheme for handling cluster split-brain conditions in order to prevent data corruption on a shared data resource used by the cluster.

SUMMARY OF THE INVENTION

It has been discovered that systems, methods, apparatus and software can make use of coordinator resources and SCSI-3 persistent reservation commands to determine which nodes of a cluster should be ejected from the cluster, thereby preventing them from corrupting data on a shared data resource. Fencing software operating on the cluster nodes monitors the cluster for a cluster partition (split-brain) event. When such an event occurs, software on at least two of the nodes attempts to unregister other nodes from a majority of coordinator resources. The node that succeeds in gaining control of the majority of coordinator resources survives. Nodes failing to gain control of a majority of coordinator resources remove themselves from the cluster. The winning node can also proceed to unregister ejected nodes from shared data resources. These operations can be performed in parallel to decrease failover time. The software can continue to execute on all nodes to prevent additional problems should a node erroneously attempt to reenter the cluster.

Accordingly, one aspect of the present invention provides a method. The method includes detecting when the computer system cluster, including a plurality of nodes and at least one coordinator resource, is partitioned. An attempt is made to gain control of a majority of the at least one coordinator resource. At least one of the plurality of nodes is removed from the computer system cluster when the attempt is unsuccessful.

In another aspect of the present invention, a system includes a protection module, a configuration module, and an administration module. The protection module is configured to receive an indication that a distributed computer system has partitioned into at least two subclusters and to take control of a majority of at least one coordinator resource. The configuration module is operable to configure the at least one coordinator resource. The administration module is operable to send one or more of a plurality of commands to the at least one coordinator resource. The plurality of commands include: a register with resource command; an unregister with resource command; a make reservation command; and a remove reservation command.

Still another aspect of the present invention provides a computer readable medium comprising program instructions for transporting data in a distributed computing system including a plurality of nodes and at least one coordinator resource. The program instructions execute on at least one of the plurality of nodes. The program instructions are operable to implement each of: detecting when the distributed computing system is partitioned; attempting to gain control of a majority of the at least one coordinator resource; and removing at least one of the plurality of nodes from the distributed computing system when the attempting is unsuccessful.

Yet another aspect of the present invention provides an apparatus including a resource fencing means, a resource commanding means, and a node commanding means. The resource fencing means is for detecting partitioning of a computer system cluster and preventing data corruption of a shared data resource. The resource commanding means is for sending at least one command to the shared resource and at least one command to at least one coordinator resource. The node commanding means is for ejecting from the computer system cluster a node belonging to the computer system cluster when the resource fencing means is unable to control a majority of the at least one coordinator resource.

The foregoing is a summary and thus contains, by necessity, simplifications, generalizations and omissions of detail; consequently, those skilled in the art will appreciate that the summary is illustrative only and is not intended to be in any way limiting. As will also be apparent to one of skill in the art, the operations disclosed herein may be implemented in a number of ways, and such changes and modifications may be made without departing from this invention and its broader aspects. Other aspects, inventive features, and advantages of the present invention, as defined solely by the claims, will become apparent in the non-limiting detailed description set forth below.

BRIEF DESCRIPTION OF THE DRAWINGS

A more complete understanding of the present invention and advantages thereof may be acquired by referring to the following description and the accompanying drawings, in which like reference numbers indicate like features.

DETAILED DESCRIPTION

The following sets forth a detailed description of at least the best contemplated mode for carrying out the one or more devices and/or processes described herein. The description is intended to be illustrative and should not be taken to be limiting.

The systems, methods, apparatus and software of the present invention make use of persistent resource registration and reservation commands. In particular, this description will focus on the use of small computer system interface version 3 (SCSI-3) persistent reservation and registration commands. However, systems, methods, apparatus and software of the present invention need not be limited to SCSI-3 commands. Any device command structure providing similar functionality can be used, and SCSI-3 persistent resource registration and reservation commands are only one example. Useful SCSI-3 commands include READ KEYS and READ RESERVATIONS persistent reservation in commands; and REGISTER, RESERVE, RELEASE, CLEAR, PREEMPT, and PREEMPT AND ABORT persistent reservation out commands. SCSI-3 defines both the physical interconnections between compliant devices and the commands which can pass among them. Devices which comply with the SCSI-3 standard can include: direct access devices, sequential access devices, printer devices, processor devices, write once read multiple devices, magnetic storage devices, compact disk (CD) devices, scanner devices, optical memory devices, media changer devices, communication devices, storage array devices, enclosure services devices, router devices, storage appliances, and simplified direct-access devices. The aforementioned devices are all examples of shared resources and shared data resources. SCSI-3 commands are described in SCSI Primary Commands-3 (SPC-3), Working Draft, Revision 03, T10, a Technical Committee of the Accredited Standards Committee of the National Committee for Information Technology Standards (NCITS), 10 Jan. 2002, which is hereby incorporated by reference herein in its entirety. SCSI-3 persistent reservation and registration commands are summarized at the end of this detailed description.

Figure 1:
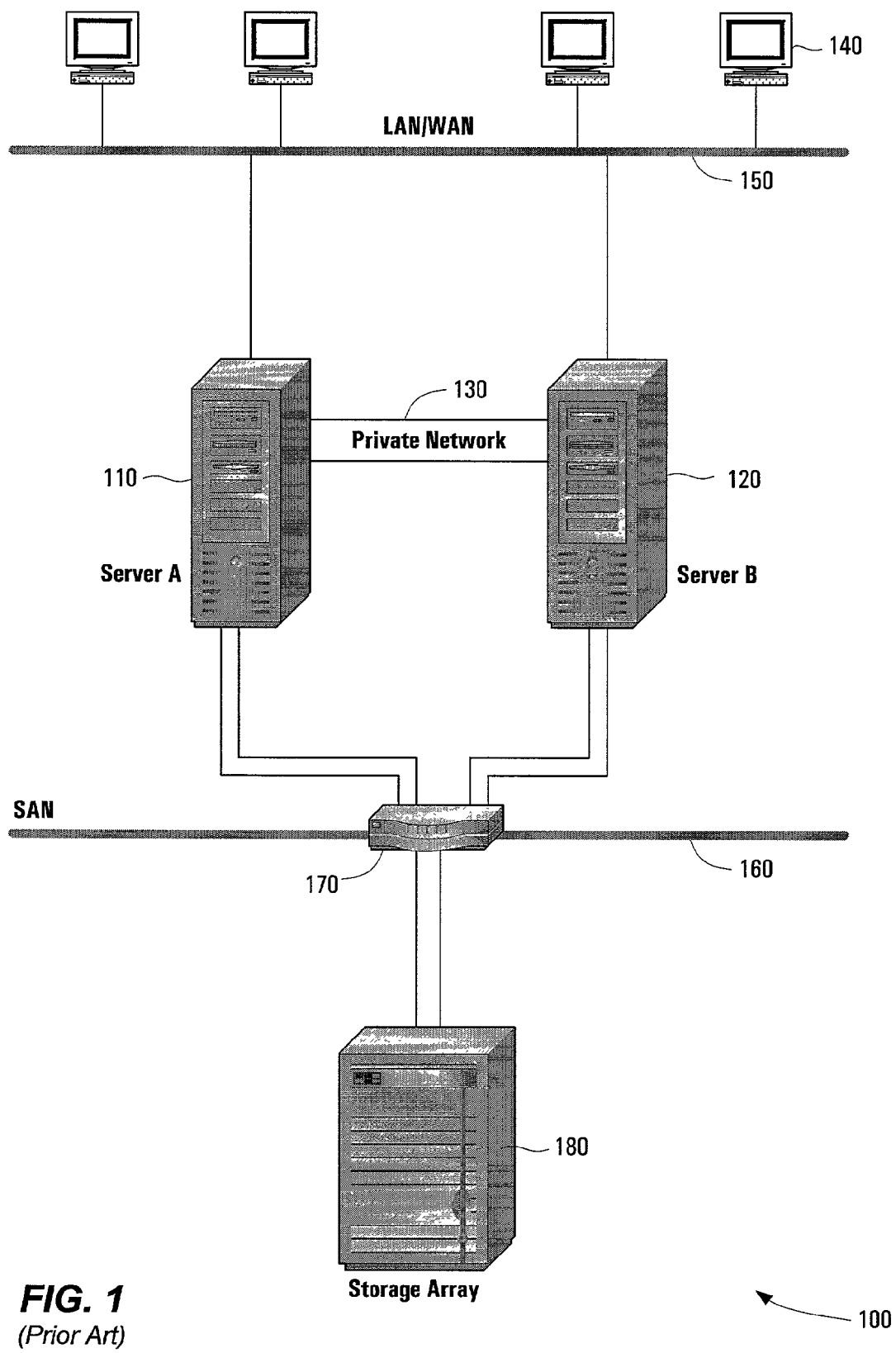
FIG. 1 is a simplified block diagram of a computer system cluster.
Figure 2:
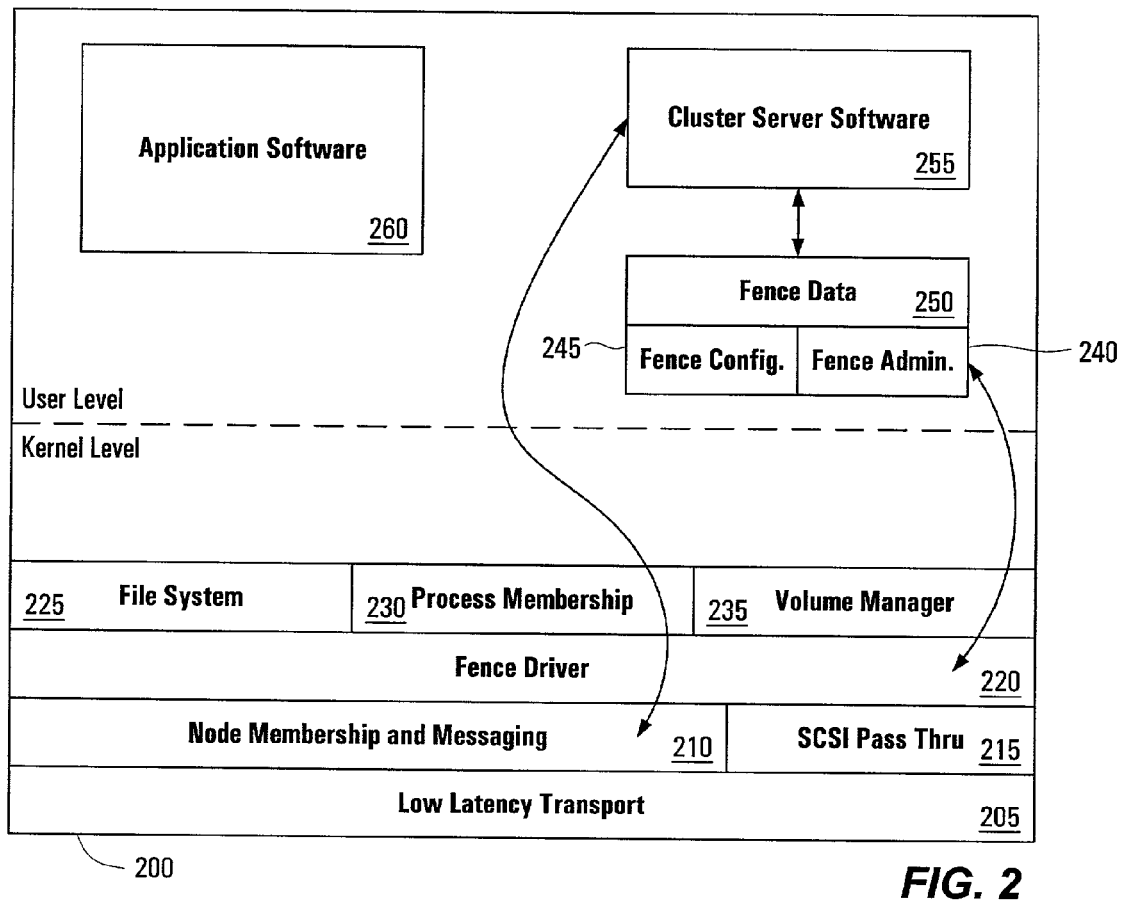
FIG. 2 illustrates some of the software components of a computer system cluster as executed on one node of the cluster.

FIG. 2 illustrates some of the software components of a computer system cluster as executed on one node of the cluster. Memory 200 is a representative memory space of a cluster node. In general, the software components are divided into those components operating at the kernel level, and those operating at the user level, as is well known in the art. Kernel level components include some basic software components supporting cluster operation. For example, low latency transport 205 provides high-speed kernel-to-kernel communications and monitors network connections between nodes. Node membership and messaging 210 is a kernel component that maintains and monitors node membership in the cluster. Node membership and messaging 210 can also provide a messaging mechanism to other software components, e.g., file system 225, process membership 230, volume management 235, and cluster server software 255. Alternatively, the functions performed by node membership and messaging 210 could be performed by software operating at the user level. SCSI pass through 215 is a hardware driving component for sending SCSI commands from other components to SCSI devices. Fence driver 220 prevents ejected cluster nodes, i.e., nodes that have lost cluster membership because of some connectivity failure, from accessing shared resources and causing data corruption. Fence driver 220 intercepts messages from node membership and messaging 210 to other software components. For example, when node membership and messaging 210 informs other software components that communication with another node has been lost, i.e., that the cluster has partitioned, fence driver 220 intercepts this message and begins taking action to protect shared resources. File system kernel component 225 provides and/or supports additional (beyond typical operating system file system capabilities) file system features including for example: quick-recovery, journaling, backup without data lock out, and online file system resizing. Process membership component 230 monitors and controls the membership of processes in the node and ensures that information on current member processes remains the same on all cluster nodes. Volume manager 235 enables physical resources configured in the cluster to be managed as logical devices or volumes.

Those having ordinary skill in the art will readily recognize that a variety of different additional kernel components can be (and typically are) utilized by a cluster node. Many of the components described above as well as some of the user level components described below are part of one or more of the VERITAS Volume Manager™, VERITAS File System™, and VERITAS Cluster Server™ products provided by VERITAS Software Corporation.

Fence driver 220 operates in conjunction with fence configuration software 245, fence administration software 240, and fence data 250. For example, fence configuration software 245 can be used by a system operator to specify and configure the coordinator resources, e.g., the coordinator disks to be used, as well as to configure fence driver 220. Fence administration software 240 similarly provides functionality for managing resource registration and reservation using key and disk group information. For example, fence administration software 240 issues to SCSI pass through 215 the SCSI-3 commands for reading and displaying keys, registering with devices, making a reservation with a device, removing registrations made by other devices, reading reservations, and removing registrations. Fence driver 220 passes those commands to SCSI pass through 215 for eventual transport to the appropriate SCSI device. Fence data 250 stores data including keys, path lists, disk drive identification, etc. Together with fence driver 220, components 240, 245, and 250 provide core functionality for the I/O fencing services used to prevent data corruption. Note that one or more of components 240, 245, and 250 can be included within other components, and/or several components can be combined.

The user level can also include software components such as the previously mentioned cluster server software 255 and application software 260, e.g., a database program.

Fencing driver 220 uses the coordinating resources as part of the I/O fencing operation. Coordinator resources are typically implemented as SCSI-3 compliant disk drives. These drives are separate from any shared data resources, e.g., data disks, and are typically not used for regular data. Thus, coordinator disks are usually excluded from control by, for example, volume manager 235. Any device servicing appropriate persistent reservation and registration commands can be used as a coordinator device. Other examples of coordinator resources include other SCSI devices, application specific integrated circuits (ASICs), and resource switches such as SAN switch 170. The use of coordinator disks enables fencing driver 220 to resolve potential split-brain conditions. If a split-brain condition occurs, the lowest node in each subcluster "races" for the coordinator disks to gain control of them. The winning node remains in the cluster, and fence driver 220 fences losing nodes off from the shared data storage. Because these nodes lose their reservations for data disks, the nodes remove themselves from the cluster ("commit suicide"). Thus, ejected systems cannot write to the data disks and corrupt data. If a node realizes that it has been ejected, it removes itself from the cluster. In a typical implementation, there are an odd number of coordinator disks so that control of a majority can be gained. Although a single coordinator disk can be used, using three or more coordinator disks provides greater protection in the event that one of the coordinator disks fails. Additionally, coordinator disks should be accessible from every node in the cluster. When there are multiple coordinator disks, the coordinator disks should be configured so that they can be accessed in a specified order by the nodes of the cluster. For example, each of the coordinator disks can be identified by serial number, and the coordinator disks accessed in order beginning from the lowest serial number to the highest. Other techniques can be used to specify the order of the coordinator disks.

Figure 3:
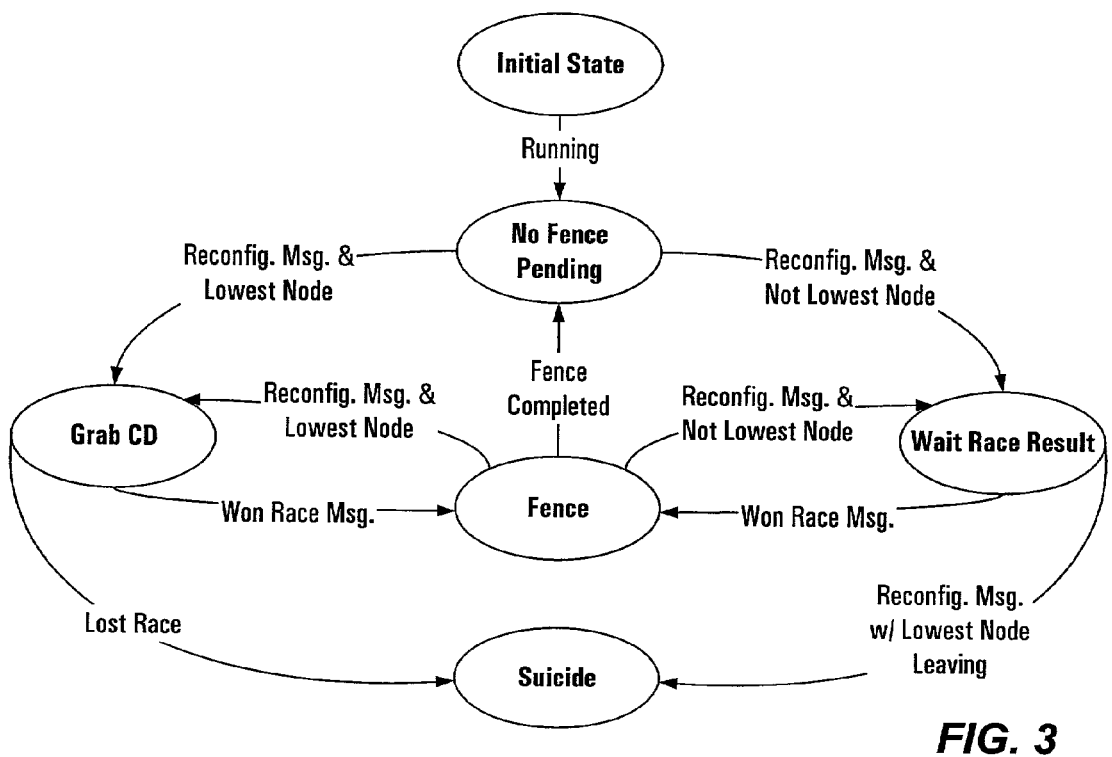
FIG. 3 is a state diagram describing the various node states associated with I/O fence operation.

FIG. 3 is a state diagram describing one embodiment of the various node states associated with I/O fence operation for a particular node in a cluster. In general, the node fence state is only valid if the node in question is in the node state "running," i.e., the node is operational and part of the cluster.

Initial State: The node is in the initial state until the node is started as part of the cluster. Once the node begins running, various initial tasks are performed including receiving node fence state information from other nodes, verifying coordinator disk order, serial numbers, etc. The transition is to the "no fence pending" state where node operation is otherwise normal.

No Fence Pending State: In this state the node awaits a membership change, e.g., brought on by a cluster partition or node failure, somewhere in the cluster that will cause additional fencing activity. An indication that a cluster partition has occurred can come in the form of a reconfigure message on a node's a primary port or client ports. The message list indicates which node is leaving the visible cluster membership. If the local node is the lowest node (e.g., has the lowest node ID) in its subcluster, operation transitions to the "grab coordinator disks" state. If the local node is not the lowest node in its subcluster, operation transitions to the "wait race result" state. Thus, although any subcluster can have more than one node, only the lowest node in the subcluster races for control of the coordinator disks. This guarantees that at most only one complete subcluster will survive. In general, the "no fence pending state" is the steady state of the I/O fencing system.

Grab Coordinator Disks State: In this state, the node races against other nodes to grab control of coordinator disks in order based on their serial numbers. This is done by SCSI-3 preempt and aborting (unregistering) the lowest node IDs in the set of nodes which have left the visible membership. If the node is able to win the race for a majority of the coordinator disks, a "won race" message is broadcast to other nodes with the generation number of the reconfiguration message. This information is used to handle cascading membership changes. Once the broadcast message has been received by other nodes and acknowledged, the node transitions to the "fence" state. The acknowledgement message is useful to make sure that all nodes have processed the "won race" message and to ensure that fencing is handled in a coordinated fashion across the cluster. If the node is unable to grab a majority of the coordinator disks, it commits suicide since it has been ejected from the cluster.

Wait Race Result State: In this state, the node waits to see if the lowest node ID in its subcluster has won the race for a majority of the coordinator disks. If the lowest node ID in the subcluster dies at this point, it means that that node has been ejected from the cluster. Therefore, the local node will commit suicide. If the node receives the broadcast "won race" message from the lowest node ID in the subcluster, it means that the node's subcluster won the race and the node transitions to the "fence" state.

Fence State: During operation in this state, kernel threads are ejecting leaving nodes from disks contained in parallel disk groups. For example, threads from fence driver 220 call volume management software to perform the fencing operation. When all nodes have ejected the nodes from data disks which failed for a particular reconfiguration message, each node will broadcast a "fence complete" message with the generation number and port number of the original reconfiguration message. When "fence complete" messages are received from all nodes, clients are unblocked. If no other reconfiguration messages are pending in the cluster, then all nodes will transition to the "no fence pending" state. Otherwise, the next reconfigure message in the cluster will be processed throughout the cluster. If a new membership is received with nodes leaving the cluster, the lowest node ID in the cluster will transition to the "grab coordinator disk" state and the other nodes will transition to the "wait race result" state.

Suicide State: In this state, the node detects that it has been ejected from the cluster. The node terminates itself ("suicide") in a controlled manner. Ejection, and thus suicide, can happen in two different ways: the node has the lowest node ID in the subcluster and lost the race for coordinator disks, and the node is waiting race result and sees that the lowest node ID in its subcluster has left the cluster.

Figure 4:
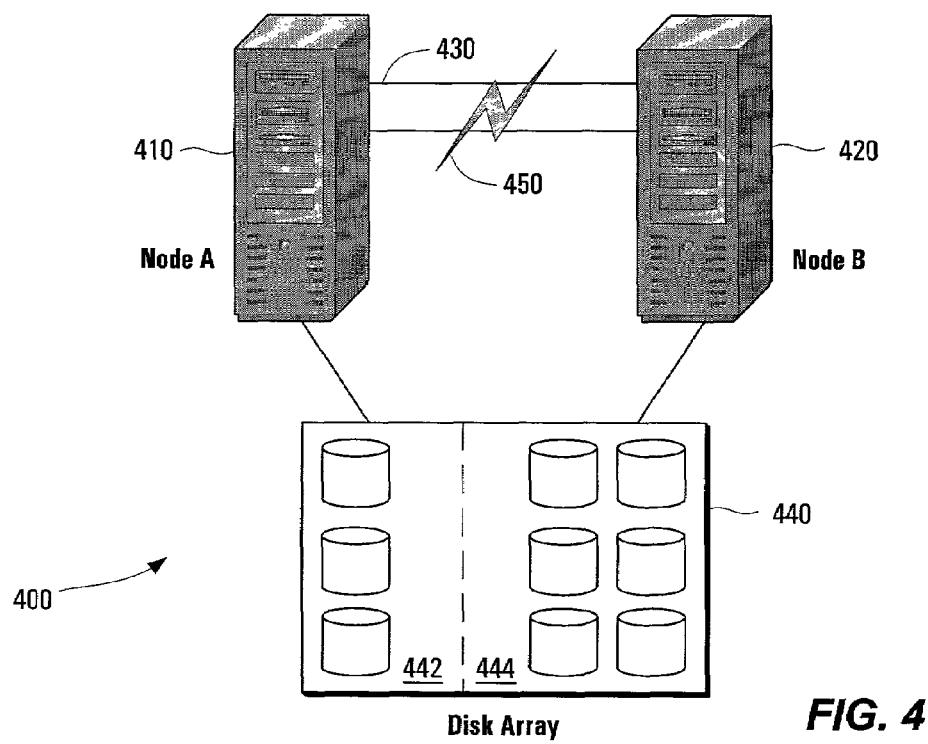
FIG. 4 is a simplified block diagram of a two node computer system cluster experiencing a private network failure.

FIG. 4 is a simplified block diagram of a two node cluster experiencing a private network failure. For convenience, various cluster elements such as clients are not shown. In this example, cluster 400 is configured for failover operation. A failover service only runs on one node at a time. If the node running the service fails, the service will be restarted on another node in the cluster. Thus, for example, node A 410 is executing some user application, e.g., a payroll application, and node B 420 stands by in the event that node A fails. Private network 430 has failed (450) and the two nodes lose contact with each other, thereby giving rise to a split-brain or partition event. Each of nodes 410 and 420 is coupled to disk array 440 that includes a number of data disks 444 and three coordinator disks 442.

Figure 5:
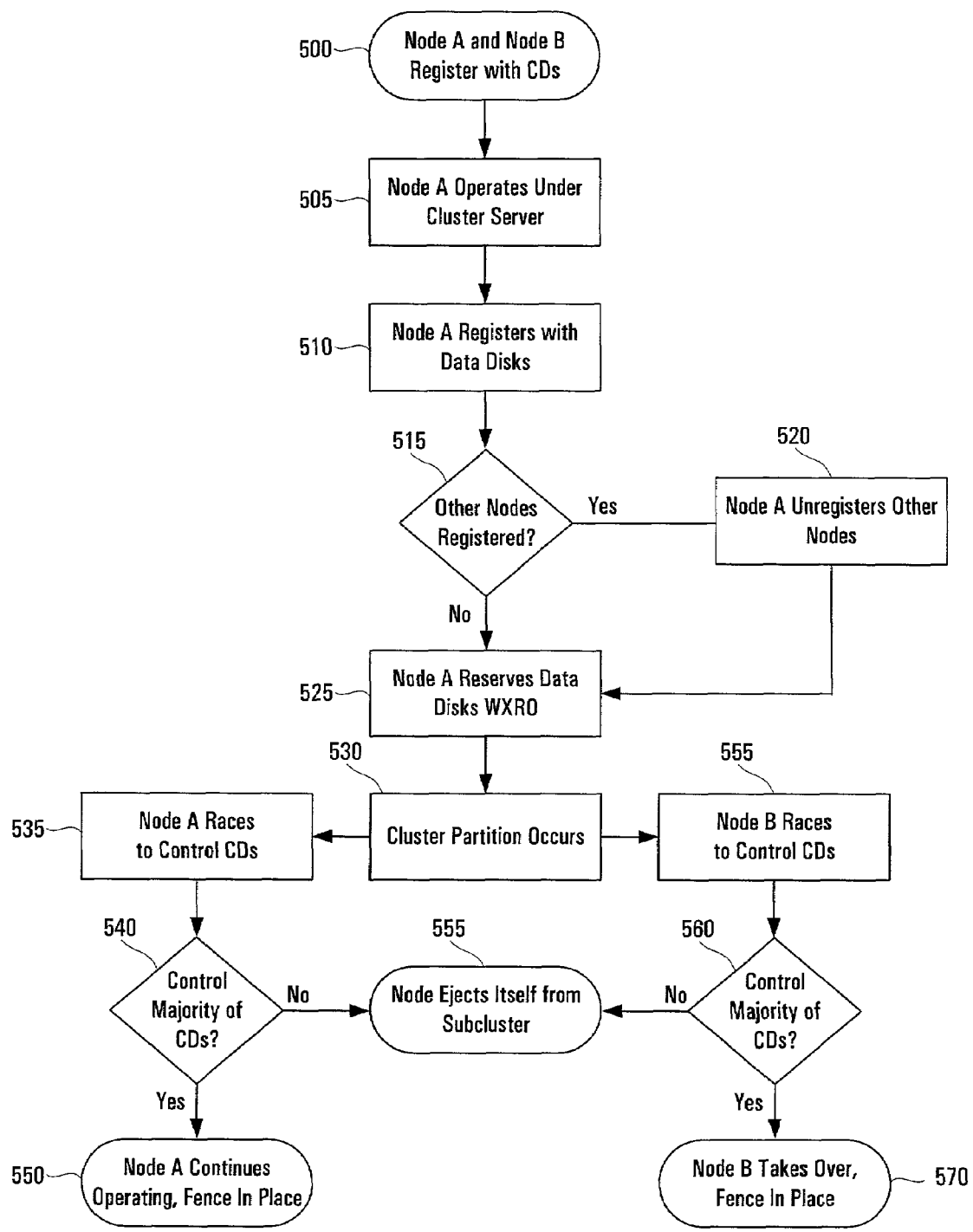
FIG. 5 is a flow chart illustrating techniques of the present invention.

Fencing software operation in the context of cluster 400 is illustrated in the flow chart shown in FIG. 5. The process begins at 500 where the payroll application is not running on any nodes in the cluster. Both nodes register with the designated coordinator disks using the PERSISTENT OUT-REGISTER command. Alternately, registration can occur manually when a system administrator configures the system. For example, a system administrator starts the payroll application on node A using appropriate cluster server software at 505. Alternately, this step can be performed as part of an automatic start-up process. In 510, node A registers with the data disks 444 in storage array 440 by issuing a PERSISTENT OUT-REGISTER command on the path between node A 410 and storage array 440 using key "K1." Node A checks if other nodes are registered with any of the data disks 444 using the PERSISTENT IN-READ KEYS command in 515. If there are additional nodes registered, node A uses a PERSISTENT OUT-PREEMPT AND ABORT command to unregister the nodes in 520. Operation then proceeds to 525. If there are no other nodes registered with any of the data disks 444 as determined in step 515, operation transitions to 525.

At 525, node A prevents data disks 444 from accepting I/Os from other nodes by issuing a PERSISTENT OUT-RESERVE with a "write exclusive-registrants only" (WXRO) reservation. This means that data disks 444 will only accept write requests from a registered node. A node which is not registered and attempting to write to the disk will receive a SCSI RESERVATION CONFLICT error. The payroll application can now proceed normally. For example, a database contained one or more of data disks 444 is started on node A. Node A reads and writes to the data disks normally.

In step 530, something has caused the cluster to partition. For example, private network 430 has failed and the two nodes lose contact with each other. On one side of the partition is node A, and on the other side node B. The fence drivers on node A and node B race for control (535 and 555) of coordinator disks 442 since these nodes are the lowest node IDs (in this case the only IDs) in their respective subclusters. This is performed by node A attempting to unregister node B from the coordinator disks using the PERSISTENT OUT-PREEMPT AND ABORT command while node B is attempting to do the same to node A. In each of 540 and 560 the respective fencing drivers determines if they were successful in gaining control of a majority of the coordinator disks 442.

One subcluster will win and the other subcluster will receive an error that it is not registered with the coordinator disk(s). Finally in step 550 node A continues operation with the I/O fence in place. Had node A failed to gain control of a majority of coordinator disks 442 as determined in 540, node A would eject itself in 555. Correspondingly, a determination is made in 560 that node B did gain control of the majority of coordinator disks 442. Node B ensures that node A is unregistered from data disks 444 in step 565. To perform that task, node B sends PERSISTENT OUT-REGISTER commands to each data disk 444 using node B's key, e.g., "K2". In general, the commands to each data disk are sent in parallel. This task must be performed because node B has not previously registered with data disks 444. Node B can then issue PERSISTENT IN-READ KEYS commands to determine the keys registered on data disks 444. If any of the data disks have a key not belonging to node B, e.g., not K2, node B can then issue PERSISTENT OUT-PREEMPT and ABORT commands to the appropriate data disks with a victim key value corresponding to that read in the previous command. In this example, node B finds that node A (key K1) is still registered, and accordingly unregisters node A. Thus in 570, node B takes over operation with an I/O fence in place. At this point additional action (not shown) can be taken by node B. For example, node B can prevent data disks 444 from accepting I/Os from other nodes by issuing a PERSISTENT OUT-RESERVE with a "write exclusive-registrants only" (WXRO) reservation. This step is similar to step 525 discussed above.

Figure 6:
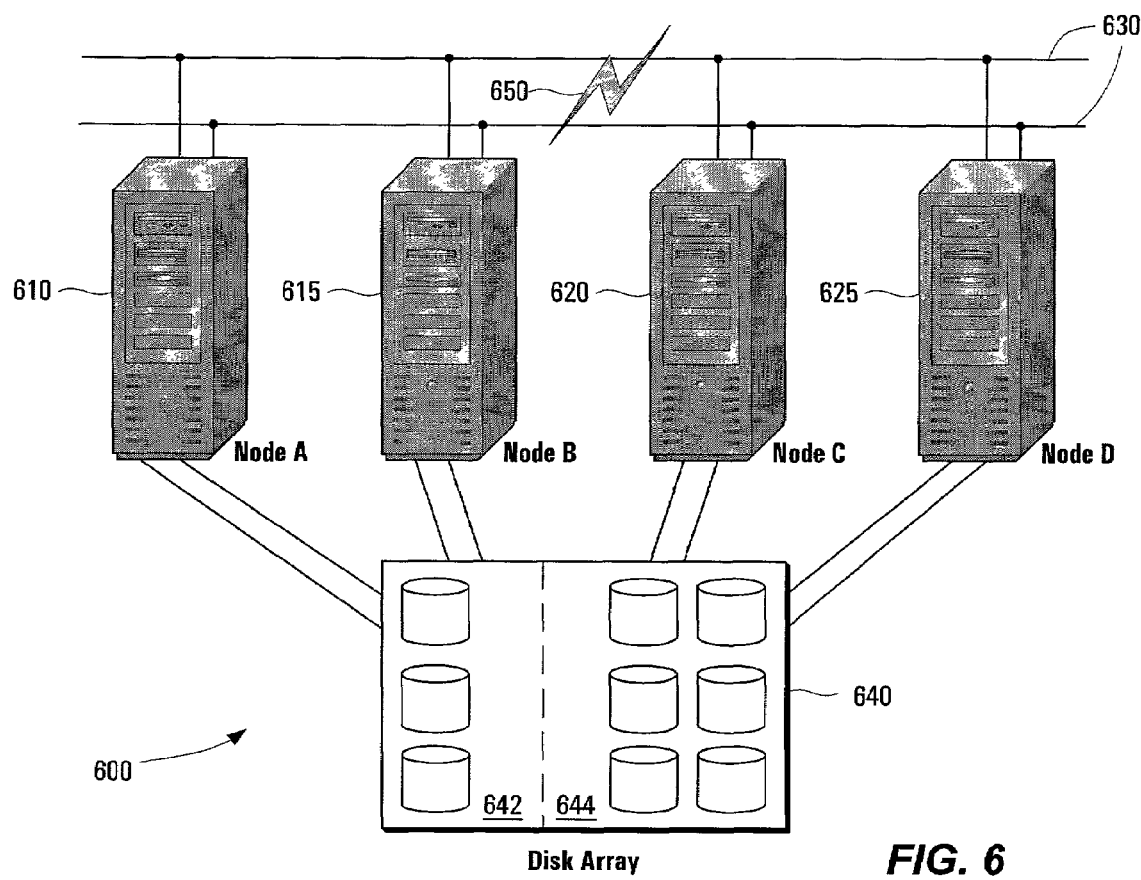
FIG. 6 is a simplified block diagram of a four node computer system cluster experiencing a private network failure.

FIG. 6 is a simplified block diagram of a four node cluster experiencing a private network failure. Again for convenience various cluster elements are not shown. In this example, cluster 600 is configured for parallel operation. A parallel service can simultaneously execute on two or more nodes. If the service fails on one node, it can be restarted on another node in the cluster. Thus, for example, each of node A 610, node B 615, node C 620, and node D 625 is executing some user application, e.g., an order entry application. In this example, each node has two paths to disk array 640, which includes coordinator disks 642 and data disks 644. Private network 630 has failed (650) thereby giving rise to a split-brain or partition event. Cluster 600 is partitioned into two subclusters, one having nodes A and B and the other having nodes C and D.

Figure 7:
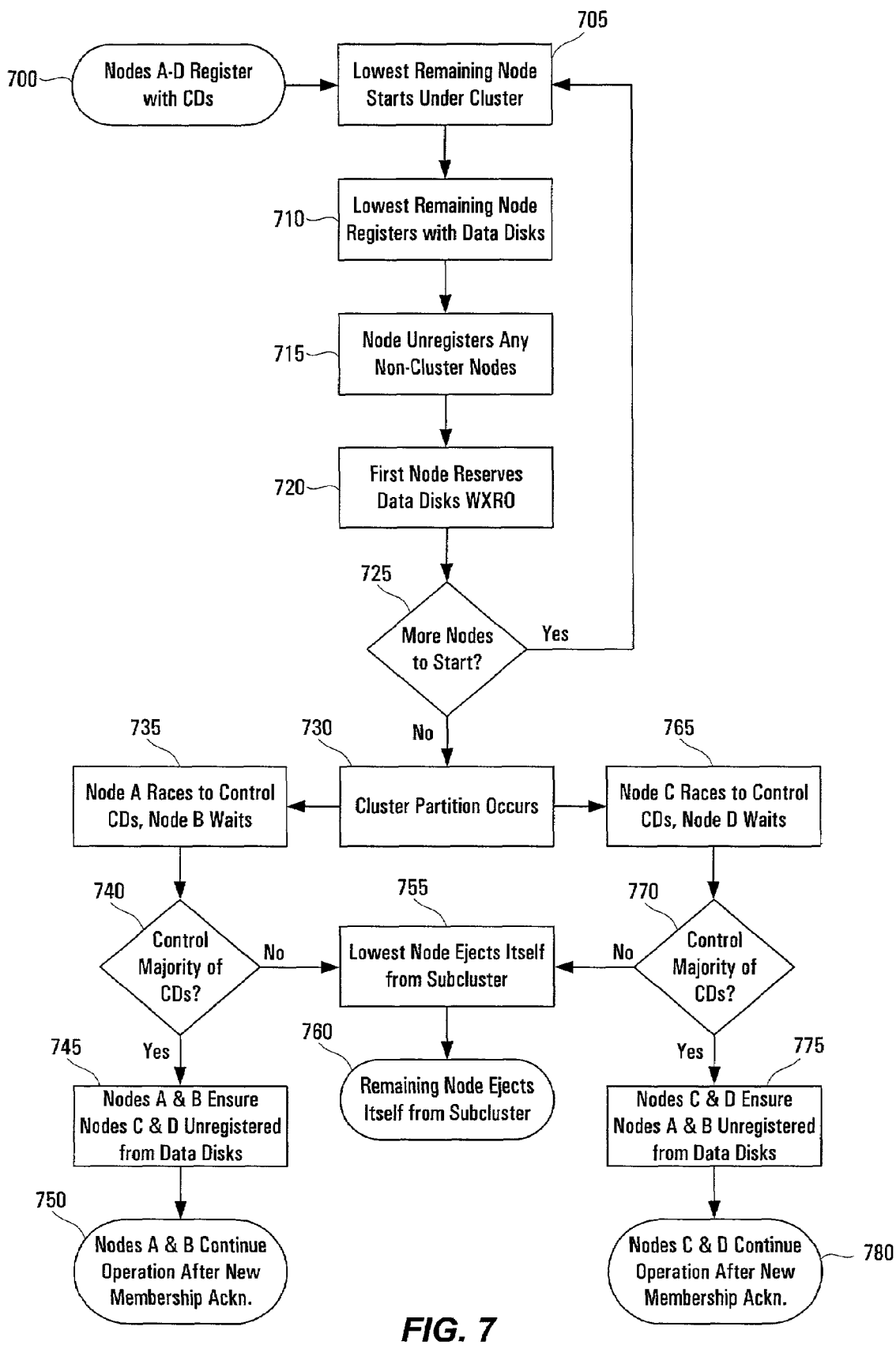
FIG. 7 is a flow chart illustrating techniques of the present invention.

Fencing software operation in the context of cluster 600 is illustrated in the flow chart shown in FIG. 7. The process begins at 700 where the order entry application is not running on any nodes in the cluster. All nodes register with the designated coordinator disks using the PERSISTENT OUT-REGISTER command. Alternately, registration can occur manually when a system administrator configures the system. For example, a system administrator starts the order entry application on the lowest remaining node, in this case node A, using appropriate cluster server software at 705. Alternately, this step can be performed as part of an automatic start-up process. In 710, the lowest remaining node (node A) registers with the data disks 644 in storage array 640 by issuing PERSISTENT OUT-REGISTER commands on each path between node A 610 and storage array 640 using key "K1." Node A checks if other nodes are registered with any of the data disks 644 using the PERSISTENT IN-READ KEYS command in 715. If there are additional nodes registered, node A uses a PERSISTENT OUT-PREEMPT AND ABORT command to unregister the nodes.

At 720, node A prevents data disks 644 from accepting I/Os from other nodes by issuing a PERSISTENT OUT-RESERVE with a "write exclusive-registrants only" reservation. This means that data disks 644 will only accept write requests from a registered node. A node which is not registered and attempting to write to the disk will receive a SCSI RESERVATION CONFLICT error. Note that in one embodiment, before a disk is marked as failed due to an I/O error, the node receiving the error can reassert its membership in the cluster, e.g., reread the coordinator resources or verify with clustering software that it is still in the cluster. If the node is not registered with the coordinator resource then the node commits suicide. The order entry application can now proceed normally. For example, a database contained on one or more of data disks 644 is started on node A. Node A reads and writes to the data disks normally. If there are additional nodes to start as determined in 725, steps 705, 710, 715, and 720 repeat as necessary with each lowest remaining node, i.e., first node B using key K2 on both paths, then node C using key K3 on both paths, and finally node D using key K4 on both paths. Note that each subsequent node will attempt to reserve data disks 644 and determine that node A has already reserved data disks 644 for "write exclusive-registrants only."

In step 730, something has caused the cluster to partition. For example, private network 630 has failed and nodes A and B lose contact with nodes C and D. On one side of the partition are nodes A and B, and on the other side nodes C and D. The fence drivers on node A (lowest node in its subcluster) and node C (lowest node in its subcluster) race for control (735 and 765) of coordinator disks 642 since these nodes are the lowest node IDs in their respective subclusters. This is performed by node A attempting to unregister nodes C and D from the coordinator disks using the PERSISTENT OUT-PREEMPT AND ABORT command while node C is attempting to do the same to nodes A and B. In general, the unregistering process proceeds through the list of coordinator disks, in serial number order, starting with the lowest node in each of the other ("deceased") subclusters and proceeding to each next lowest node in each of the deceased subclusters. In each of 740 and 770 the respective fencing drivers determines if they were successful in gaining control of a majority of the coordinator disks 642.

One subcluster will win and the other subcluster will receive an error that it is not registered with the coordinator disk(s). In 745, node A has won the race, and it broadcasts a message to that effect to other nodes. Node A, and possibly node B, issues PERSISTENT OUT-PREEMPT and ABORT commands to the appropriate data disks along the appropriate paths with a victim key value corresponding to nodes C and D. For example, it may be the case with multiple shared data resources in the cluster that node A doe does not have access to all of the same shared data resources as node B. In that case, it is important that both nodes unregister nodes C and D from the data disks. When each node has finished fencing data disks, it broadcasts an appropriate message. Upon receipt of these messages, nodes A and B deliver the new cluster membership information to appropriate software, e.g., volume management software, file system software, cluster server software, and application software. The unregistration process causes nodes C and D to lose their registrations and therefore to no longer be able to write to the data disks. Once nodes A and B receive acknowledgment that membership information has been received, they continue operation with the I/O fence in place as shown in step 750.

Had node A failed to gain control of a majority of coordinator disks 642 as determined in 740, node A would eject itself in 755. As the remaining node in a subcluster whose lowest node has ejected itself, node B determines that it must eject itself from the subcluster (760). Correspondingly, a determination is made in 770 that node C did gain control of the majority of coordinator disks 442. Node C broadcasts a message to that effect to other nodes. Nodes C and D eject nodes A and B from data disks 644 in step 775. If necessary, node C sends PERSISTENT OUT-REGISTER commands to each data disk 644 using node C's and node D's keys. This typically occurs before nodes A and B are ejected. In the example of FIG. 7, it is not necessary because nodes C and D have already registered with data disks 644. Node C can then issue PERSISTENT IN-READ KEYS commands to determine the keys registered on data disks 644. If any of the data disks have a key not belonging to node C or D, node C can then issue PERSISTENT OUT-PREEMPT and ABORT commands to the appropriate data disks with a victim key value corresponding to that read in the previous command. In this example, node C finds that nodes A (key K1) and B (key K2) are still registered, and accordingly unregisters both nodes. Operation of step 775 is similar to 745 and so node D can participate in the fencing operation. Thus in 780 nodes C and D receive acknowledgment that membership information has been received, and they continue operation with the I/O fence in place.

The flow charts of FIGS. 5 and 7 illustrate two among many operational examples the I/O fencing system. Those having ordinary skill in the art will readily recognize that certain steps illustrated in FIGS. 5 and 7 can be eliminated or taken in an alternate order. Moreover, the methods described in FIGS. 5 and 7 are typically implemented as one or more software programs for a computer system, that is encoded in a computer readable medium as instructions executable on one or more processors. The computer readable medium can be any one of an electronic storage medium, a magnetic storage medium, an optical storage medium, and a communications medium conveying signals encoding the instructions. Separate instances of these programs can be executed on separate computer systems in keeping with the multi-process methods described above.

Additionally, those having ordinary skill in the art will readily recognize that the techniques described above can be utilized in a variety of different cluster systems with variations in, for example, the number of nodes, the type of cluster operation (failover, parallel, etc.), the number and type of shared data resources, the number of paths between nodes and shared data resources, and the number and type of coordinator resources. Although examples where there is only one partition have been shown, the systems, methods, apparatus and software can work equally well where multiple partitions occur, e.g., cascading failure. Also, the examples above have been discussed in the context of SCSI-3 persistent reservations and registration. Other persistent reservation and registration schemes could be used if available. Moreover, extensions to the SCSI-3 standard might include additional commands or command features useful for the techniques described. For example, other reservation types can include write exclusive-all registrants, similar to WXRO except that when the creator of the reservation deregisters the reservation remains until all other registrants exit and any registrant can release the reservation; and exclusive access-all registrants, similar to the SCSI-3 exclusive access-registrants only reservation type except that when the creator of the reservation deregisters the reservation remains until all other registrants exit and any registrant can release the reservation.

Figure 8:
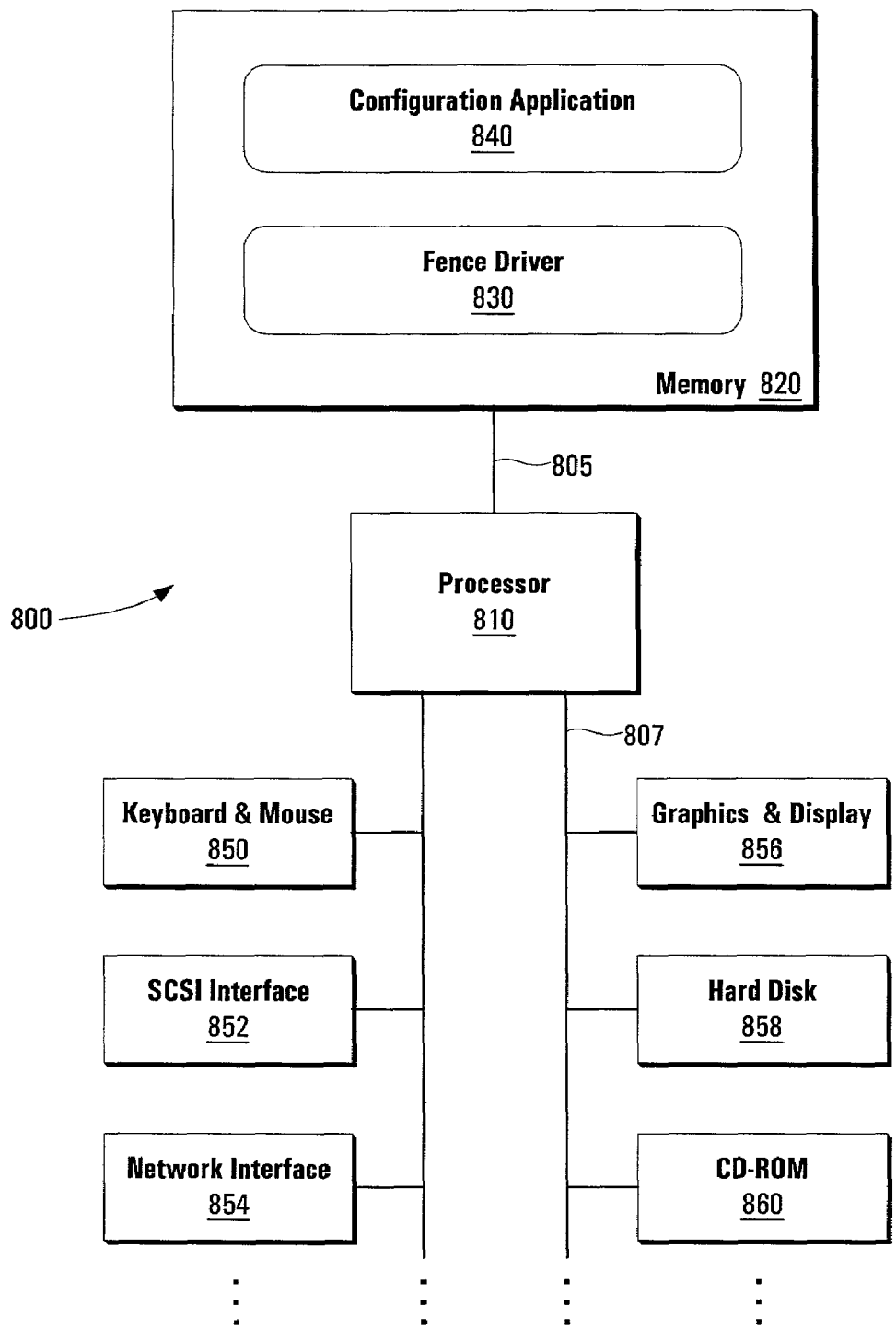
FIG. 8 is a block diagram of a computer system for implementing the techniques of the present invention.

FIG. 8 illustrates a block diagram of a computer system 800 for implementing the fencing techniques of the present invention. For example, computer system 800 can be an embodiment of one of the previously described cluster nodes. Computer system 800 includes a processor 810 and a memory 820 coupled together by communications bus 805. Processor 810 can be a single processor or a number of individual processors working together. Memory 820 is typically random access memory (RAM), or some other dynamic storage device, and is capable of storing instructions to be executed by the processor, e.g., configuration application 840, and fence driver 830. Memory 820 is also used for storing temporary variables or other intermediate information during the execution of instructions by the processor 810.

Those having ordinary skill in the art will readily recognize that the techniques and methods discussed below can be implemented in software using a variety of computer languages, including, for example, traditional computer languages such as assembly language, Pascal, and C; object oriented languages such as C++ and Java; and scripting languages such as Perl and Tcl/Tk. Additionally, software 830 and 840 can be provided to the computer system via a variety of computer readable media including electronic media (e.g., flash memory), magnetic storage media (e.g., hard disk 858, a floppy disk, etc.), optical storage media (e.g., CD-ROM 860), and communications media conveying signals encoding the instructions (e.g., via a network coupled to network interface 854).

Computer system 800 also includes devices such as keyboard & mouse 850, SCSI interface 852, network interface 854, graphics & display 856, hard disk 858, and CD-ROM 860, all of which are coupled to processor 810 by communications bus 807. It will be apparent to those having ordinary skill in the art that computer system 800 can also include numerous elements not shown in the figure, such as additional storage devices, communications devices, input devices, and output devices, as illustrated by the ellipsis shown. An example of such an additional computer system device is a fibre channel interface.

Although the present invention has been described with respect to a specific preferred embodiment thereof, various changes and modifications may be suggested to one skilled in the art and it is intended that the present invention encompass such changes and modifications fall within the scope of the appended claims.

Summary of SCSI-3 Persistent Reservations and Registration

The persistent reservations management method is the mechanism specified by the SCSI-3 standard ("the standard") for use by multiple initiators that require operations to be protected across initiator failures, which usually involve hard resets. Persistent reservations persist across recovery actions, to provide initiators with more detailed control over reservations recovery. Persistent reservations are not reset by the TARGET RESET task management function or other global actions. Persistent reservations for failing initiators may be preempted by another initiator as part of the recovery process. Persistent reservations are retained by the device server until released, preempted, or cleared by mechanisms specified in the standard. Even though different SCSI protocols that transport SCSI commands handle hard resets differently (e.g., parallel uses a reset signal, fibre channel loops use primitive signals) the persistent reservation shall be preserved. Optionally, persistent reservations may be retained when power to the target is removed.

The PERSISTENT RESERVE OUT and PERSISTENT RESERVE IN commands provide the basic mechanism for dynamic contention resolution in multiple initiator systems using multiple port targets. Before a persistent reservation may be established, an initiator shall register with a device server using a reservation key. Reservation keys are necessary to allow: a) authentication of subsequent PERSISTENT RESERVE OUT commands; b) identification of other initiators that are registered; c) identification of the reservation key(s) that have an associated reservation; d) preemption of a persistent reservation from a failing or uncooperative initiator; and e) multiple initiators to participate in a reservation. The reservation key provides a method for the application client to associate a protocol-independent identifier with an initiator on a specific port of a device server. The reservation key is used in the PERSISTENT RESERVE IN command to identify which initiators are registered and which initiator, if any, holds the reservation. The reservation key is used in the PERSISTENT RESERVE OUT command to register an initiator, to verify the initiator issuing the PERSISTENT RESERVATION OUT command is registered, and to specify which initiator's registration or persistent reservation to preempt. Reservation key values may be used by application clients to identify initiators, using application specific methods that are outside the scope of this standard.

The application client may request activation of the persist through power loss device server capability to preserve the persistent reservation and registration keys across power cycles. After the application client enables the persist through power loss capability the device server shall preserve all current and future registrations and persistent reservations associated with the logical unit to which the REGISTER or the REGISTER AND IGNORE EXISTING KEY service action was addressed until an application client disables the persist through power loss capability. The APTPL value from the most recent successfully completed REGISTER or REGISTER AND IGNORE EXISTING KEY service action from any application client shall determine the logical unit's behavior in the event of a power loss. The device server shall preserve the following information for each registration across any reset, and if the persist through power loss capability is enabled, across any power cycle: a) initiator identifier; b) reservation key; and c) when supported by the SCSI protocol, the initiator port's world wide identification. The device server shall preserve the following reservation information across any reset, and if the persist through power loss capability is enabled, across any power cycle: a) initiator identifier; b) reservation key; c) scope; d) type; and e) when supported by the SCSI protocol, the initiator port's world wide identification.

The application client may obtain information about the persistent reservation and the reservation keys that are present within a device server by issuing PERSISTENT RESERVE IN commands with a READ RESERVATION service action or a READ KEYS service action.

An application client may issue a PERSISTENT RESERVE IN command with a service action of READ KEYS to determine if any initiators have registered with a logical unit. In response to a PERSISTENT RESERVE IN with a READ KEYS service action the device server shall report the following: a) the current generation value; and b) the reservation key for every initiator that is currently registered. The generation value allows the application client to verify that the configuration of the initiators registered with a logical unit has not been modified. The application client may examine the reservation keys to identify relationships between initiators based on mechanisms that are outside the scope of this standard. Duplicate keys shall be reported if multiple initiators use the same reservation key.

An application client may issue a PERSISTENT RESERVE IN command with a service action of READ RESERVATION to receive the persistent reservation information. In response to a PERSISTENT RESERVE IN command with a READ RESERVATION service action the device server shall report the following as an uninterrupted series of actions: a) the current generation value; b) the registered reservation key, if any, associated with the initiator that holds the persistent reservation; c) the scope and type of each persistent reservation, if any; and d) the scope-specific address, if any. If an application client uses a different reservation key for each initiator/logical unit pair the application client may use the reservation key to associate the persistent reservation with the initiator that holds the persistent reservation.

To establish a persistent reservation the initiator shall first register with a logical unit. An initiator registers with a logical unit by issuing a PERSISTENT RESERVE OUT command with service action of REGISTER or REGISTER AND IGNORE EXISTING KEY. If the initiator has not yet established a reservation key or the reservation key has been removed, the registration is accomplished by issuing a PERSISTENT RESERVE OUT command with service action of REGISTER with the certain parameters. If the initiator has an established registration it may change its reservation key. This is accomplished by issuing a PERSISTENT RESERVE OUT command with service action of REGISTER with necessary parameters. Alternatively, an initiator may establish a reservation key without regard for whether one has previously been established by issuing a PERSISTENT RESERVE OUT command with a service action of REGISTER AND IGNORE EXISTING KEY and the necessary parameters. If a PERSISTENT RESERVE OUT with a REGISTER AND IGNORE EXISTING KEY service action is sent when an established registration key exists, the registration shall be superseded with the specified service action reservation key. If a PERSISTENT RESERVE OUT with a REGISTER AND IGNORE EXISTING KEY service action is sent when there is no established registration key, a new registration shall be established. If a PERSISTENT RESERVE OUT with a REGISTER or a REGISTER AND IGNORE EXISTING KEY service action is attempted, but there are insufficient device server resources to complete the operation, the device server shall return a CHECK CONDITION status. In response to a PERSISTENT RESERVE OUT with a REGISTER or a REGISTER AND IGNORE EXISTING KEY service action the device server shall perform a registration via a specified series of actions.

After the registration request has been processed, the device server shall then allow other PERSISTENT RESERVE OUT commands from the registered initiator to execute. For each initiator that performs a PERSISTENT RESERVE OUT with a REGISTER or a REGISTER AND IGNORE EXISTING KEY service action, the device server shall retain the reservation key until the key is changed by a new PERSISTENT RESERVE OUT command with the REGISTER or the REGISTER AND IGNORE EXISTING KEY service action from the same initiator or until the initiator registration is removed. Any PERSISTENT RESERVE OUT command service action received from an unregistered initiator, other than the REGISTER or the REGISTER AND IGNORE EXISTING KEY service action, shall be rejected with a RESERVATION CONFLICT status.

An application client creates a persistent reservation by issuing a PERSISTENT RESERVE OUT command with a service action of RESERVE through a registered initiator with the following parameters: a) RESERVATION KEY set to the value of the initiator/logical unit pair's established reservation key; and b) TYPE and SCOPE set to the reservation being created. Only one persistent reservation with a scope of logical unit is allowed at a time per logical unit. Multiple persistent reservations with a scope of element may be created in a logical unit that contains multiple elements. However, there shall only be one persistent reservation per element. If the target receives a PERSISTENT RESERVE OUT command that attempts to create a persistent reservation when a persistent reservation already exists for the logical unit from an initiator other than the initiator that created the reservation, then the command shall be rejected with a RES- ERVATION CONFLICT status. If the initiator that created the persistent reservation attempts to modify the TYPE or SCOPE of an existing reservation, then the command shall be rejected with a RESERVATION CONFLICT status. If the target receives a RESERVE(10) or RESERVE(6) command when a persistent reservation exists for the logical unit then the command shall be rejected with a RESERVATION CONFLICT.

A registered initiator using the value of the initiator/logical unit pair's established reservation key may release or preempt a persistent reservation by issuing one of the following commands: a) a PERSISTENT RESERVE OUT command with a service action of RELEASE from the initiator that performed the reservation; b) a PERSISTENT RESERVE OUT command with a PREEMPT service action specifying the reservation key of the initiator holding the reservation; c) a PERSISTENT RESERVE OUT command with a PREEMPT AND ABORT service action specifying the reservation key of the initiator holding the reservation; or d) a PERSISTENT RESERVE OUT command with a service action of CLEAR service action.

A registered initiator using the value of the initiator/logical unit pair's established reservation key may remove a registration by issuing one of the following commands: a) a PERSISTENT RESERVE OUT command with a PREEMPT service action specifying that reservation key; b) a PERSISTENT RESERVE OUT command with a PREEMPT AND ABORT service action specifying that reservation key; c) a PERSISTENT RESERVE OUT command with a CLEAR service action; or d) a PERSISTENT RESERVE OUT command with a REGISTER or a REGISTER AND IGNORE EXISTING KEY service action from the same initiator with the value of the service action reservation key field set to zero.

When a reservation key has been removed, no information shall be reported for that unregistered initiator in subsequent READ KEYS service action(s) until the initiator is registered again. Any persistent reservation associated with that unregistered initiator shall be released. If that released persistent reservation was of the type Write Exclusive-Registrants Only or Exclusive Access-Registrants Only the device server shall establish a unit attention condition for all registered initiators other than the initiator that issued the PERSISTENT RESERVE OUT command with PREEMPT or PREEMPT AND ABORT service action. The sense key shall be set to UNIT ATTENTION and the additional sense data shall be set to RESERVATIONS RELEASED. A persistent reservation may also be released by a loss of power, if the persist through power loss capability is not enabled.

What is claimed is:

1. A method comprising:
    detecting when a computer system cluster including at least one coordinator storage device is partitioned, wherein the computer system cluster is partitioned into a first subcluster comprising at least a first node and a second subcluster comprising at least a second node;
    identifying, for an attempt to unregister, the first node of the first subcluster;
    attempting to unregister a key associated with the first node on a majority of the at least one coordinator storage device, wherein the identifying and the attempting are performed by the second node;
    sending an unregister with resource command to a shared data resource in response to having unregistered said key on the majority of the at least one coordinator storage device; and
    removing at least the second node from the computer system cluster when the attempting is unsuccessful.

2. The method of claim 1 wherein
    the shared data resource supports small computer system interface version three (SCSI-3) persistent reservation commands.

3. The method of claim 1 wherein the at least one coordinator storage device includes at least three devices supporting small computer system interface version three (SCSI-3) persistent reservation commands.

4. The method of claim 1 wherein the detecting further comprises:
    monitoring a network coupled to each of a plurality of nodes in the computer system cluster for a heartbeat signal; and
    determining when the heartbeat signal is not present for a specified period of time.

5. The method of claim 1 wherein,
    the attempting further comprises:
        sending a command to the at least one coordinator storage device, the command for unregistering at least another node from the at least one coordinator storage device;
    the first subcluster further comprises a third node; and
    said identifying further comprises identifying the first node of the first subcluster, based upon the value of the node identifier associated with the first node being a lowest node identifier value associated with any node included in the first subcluster.

6. The method of claim 1 further comprising:
    sending, when the attempting is successful, a message to at least another node that the attempting was successful.

7. The method of claim 1 further comprising:
    retaining the second node in the computer system cluster when the attempting is successful.

8. The method of claim 7 wherein the computer system cluster includes at least one shared data resource, the method further comprising:
    registering the second node with the at least one shared data resource;
    determining when the at least one shared data resource is registered to a removed node;
    unregistering the removed node from the at least one shared data resource.

9. A system comprising:
    a first node comprising a first processor and a memory coupled to the first processor;
    a protection module configured to receive an indication that a distributed computer system has partitioned into a first subcluster and a second subcluster and to take control of a majority of at least one coordinator storage device, wherein the first subcluster comprises the first node, and wherein the first node comprises the protection module;
    a configuration module operable to configure the at least one coordinator storage device; and
    an administration module operable to send one or more of a plurality of commands to the at least one coordinator storage device, wherein
        the protection module is configured to cause the administration module to send a command to unregister a key to the at least one coordinator storage device, wherein the key is associated with a node identified for an attempt to unregister, and
        the protection module is further configured to cause the administration module to send an unregister with resource command to a shared data resource in response to the protection module having unregistered the key on a majority of the at least one coordinator storage device.

10. The system of claim 9 wherein the plurality of commands include:
a register with resource command;
an unregister with resource command;
a make reservation command; and
a remove reservation command.

11. The system of claim 9 wherein:
the administration module is further operable to send one or more of a plurality of commands to a shared data resource including a device supporting small computer system interface version three (SCSI-3) persistent reservation commands, and
the at least one coordinator storage device includes a device supporting small computer system interface version three (SCSI-3) persistent reservation commands.

12. The system of claim 9 wherein the one or more of a plurality of commands is a persistent command.

13. The system of claim 9 wherein the protection module is further configured to cause the administration module to send an unregister with resource command to each of the at least one coordinator storage device when the protection module receives an indication that a distributed computer system has partitioned.

14. The system of claim 9 wherein
the second subcluster comprises the node identified for an attempt to unregister and an additional node; and
the node identified for the attempt to unregister is identified for the attempt to unregister in response to the node identified for the attempt to unregister having a node identifier lower than the additional node.

15. The system of claim 9 wherein the protection module is further configured to terminate when it fails to take control of a majority of the at least one coordinator storage device.

16. The system of claim 9 further comprising:
a second node; and
a private network coupled between the first node and the second node.

17. A computer readable storage medium comprising program instructions for transporting data in a distributed computing system including at least one coordinator storage device, wherein the program instructions execute on a first node of the distributed computing system and wherein the program instructions are executable to:
detect when the distributed computing system is partitioned into a first subcluster comprising the first node and a second subcluster;
identify, for an attempt to unregister, a first node of the second subcluster;
attempt to unregister a key associated with the first node of the second subcluster on a majority of the at least one coordinator storage device;
send an unregister with resource command to a shared data resource in response to having unregistered the key on a majority of the at least one coordinator storage device; and
remove the first node from the distributed computing system when the attempting is unsuccessful.

18. The computer readable storage medium of claim 17, the program instructions being further executable to:
send to the at least one coordinator resource a command for unregistering a second node of the second subcluster from the at least one coordinator resource.

19. An apparatus comprising:
a network interface means for accessing a network comprising a first node and a second node;
a resource fencing means for detecting partitioning of a computer system cluster into a first subcluster comprising the first node and a second subcluster comprising the second node and preventing data corruption of a shared data resource;
a resource commanding means for sending at least one command to the shared resource and at least one command to unregister a key to at least one coordinator storage device, wherein the key is associated with a node identified for unregistering;
a protection means for sending an unregister with resource command to the shared data resource in response to having unregistered the key on a majority of the at least one coordinator storage device; and
a node commanding means for ejecting from the computer system cluster the first node when the resource fencing means is unable to control the majority of the at least one coordinator resource.

20. The apparatus of claim 19 wherein:
the at least one command to the shared resource is a small computer system interface version three (SCSI-3) command and wherein the at least one command to the at least one coordinator storage device is a SCSI-3 command.

21. The apparatus of claim 20 wherein the at least one SCSI-3 command to the shared resource is a persistent command and wherein the at least one SCSI-3 command to the at least one coordinator storage device is a persistent command.

* * * * *